(12) United States Patent
Stettner et al.

(10) Patent No.: US 9,400,982 B2
(45) Date of Patent: Jul. 26, 2016

(54) REAL TIME TELEVISION ADVERTISEMENT SHAPING

(75) Inventors: Armando P. Stettner, Westford Lane, MA (US); Donald Gene Archer, Euless, TX (US); Harpal Singh Bassali, San Francisco, CA (US); Dolapo Kukoyi, Irving, TX (US); Michael P. Ruffini, Methuen, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 818 days.

(21) Appl. No.: 12/568,875

(22) Filed: Sep. 29, 2009

(65) Prior Publication Data
US 2011/0078723 A1    Mar. 31, 2011

(51) Int. Cl.
| H04N 7/10 | (2006.01) |
| H04N 7/025 | (2006.01) |
| G06Q 30/02 | (2012.01) |
| H04N 21/433 | (2011.01) |
| H04N 21/435 | (2011.01) |
| H04N 21/235 | (2011.01) |
| H04N 21/258 | (2011.01) |
| H04N 21/482 | (2011.01) |
| H04N 21/81 | (2011.01) |
| H04N 21/84 | (2011.01) |

(52) U.S. Cl.
CPC ............ *G06Q 30/02* (2013.01); *H04N 21/235* (2013.01); *H04N 21/25891* (2013.01); *H04N 21/435* (2013.01); *H04N 21/4331* (2013.01); *H04N 21/4828* (2013.01); *H04N 21/812* (2013.01); *H04N 21/84* (2013.01)

(58) Field of Classification Search
CPC ............ H04N 21/812; H04N 21/4331; H04N 21/435; H04N 21/235; G06Q 30/02
USPC ............ 725/13, 19, 32–61; 705/14.49, 14.53, 705/14.54, 14.55
See application file for complete search history.

(56) References Cited

U.S. PATENT DOCUMENTS

| 7,051,351 | B2* | 5/2006 | Goldman et al. ................ 725/34 |
| 8,037,496 | B1* | 10/2011 | Begeja et al. .................... 725/53 |
| 2002/0120929 | A1* | 8/2002 | Schwalb et al. ................ 725/32 |
| 2003/0097301 | A1 | 5/2003 | Kageyama et al. |
| 2006/0090185 | A1* | 4/2006 | Zito et al. ........................ 725/46 |
| 2006/0179453 | A1* | 8/2006 | Kadie et al. ..................... 725/34 |
| 2006/0179454 | A1 | 8/2006 | Shusman |
| 2006/0282533 | A1* | 12/2006 | Steelberg et al. ............. 709/224 |
| 2007/0140595 | A1* | 6/2007 | Taylor ................ G06K 9/00664 382/310 |
| 2008/0077959 | A1* | 3/2008 | Kirimura et al. ................ 725/46 |
| 2008/0215428 | A1 | 9/2008 | Ramer et al. |
| 2008/0244638 | A1* | 10/2008 | Ryden ............................. 725/34 |
| 2009/0113468 | A1* | 4/2009 | Steelberg et al. ............... 725/32 |
| 2009/0148045 | A1* | 6/2009 | Lee et al. ...................... 382/190 |
| 2009/0222854 | A1* | 9/2009 | Cansler ............. H04N 7/17318 725/35 |
| 2009/0234727 | A1 | 9/2009 | Petty |

* cited by examiner

*Primary Examiner* — Hunter B Lonsberry
*Assistant Examiner* — Patrick A Ryan

(57) ABSTRACT

A multimedia client receives, over a subscription multimedia network, television content for presentation to a viewer, where the television content includes an advertising break and identifies a keyword associated with the television content. The multimedia client sends, over the subscription multimedia network, the keyword to an advertisement server and receives from the advertisement server, an advertisement corresponding to the keyword. The multimedia client then provides, for display to the viewer, the advertisement within the advertising break.

23 Claims, 11 Drawing Sheets

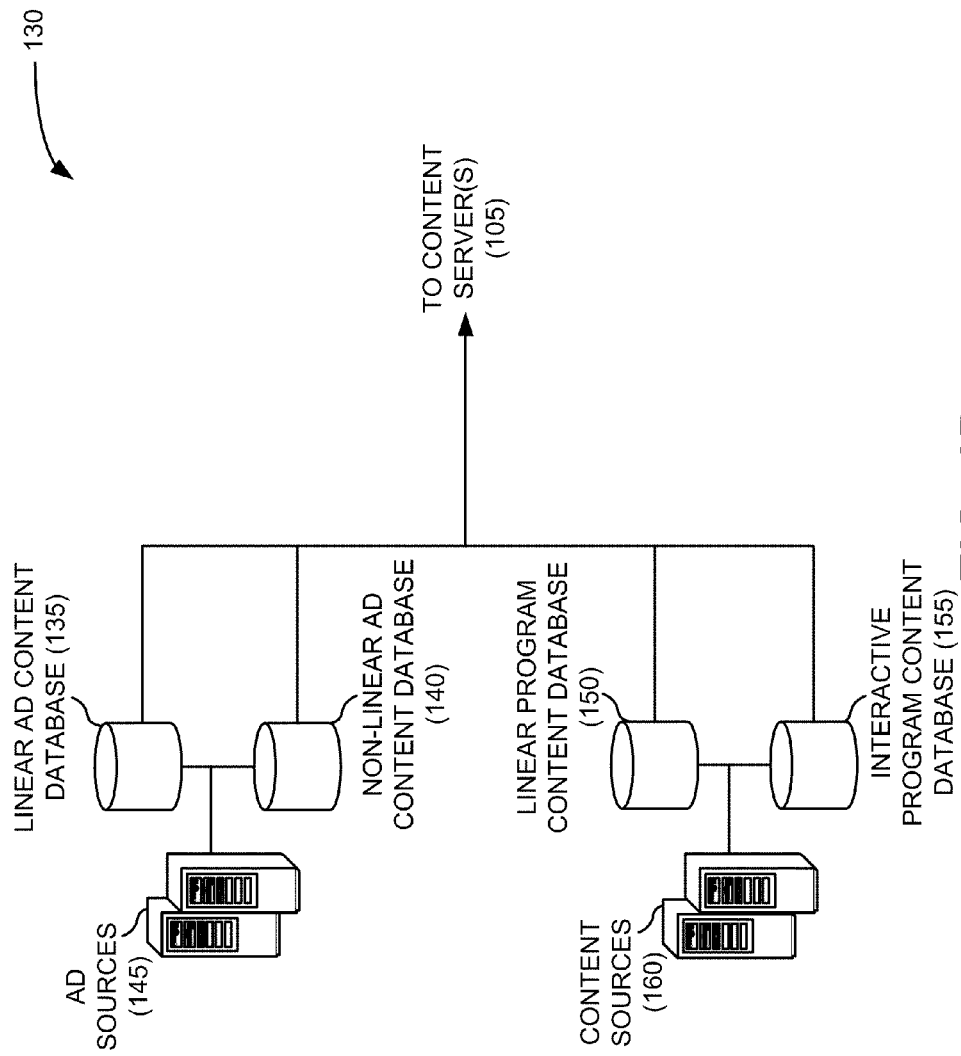

REAL TIME TELEVISION ADVERTISEMENT SHAPING

BACKGROUND INFORMATION

As media outlets proliferate and viewing audiences become more fragmented, advertisers, such as television advertisers, are having greater difficulty capturing and holding viewer attention. Consequently, it is more critical than ever that advertisements be creative and reach beyond a traditional linear format.

BRIEF DESCRIPTION OF THE DRAWINGS

FIGS. 1A and 1B depict an exemplary network in which systems and/or methods described herein may be implemented;

DETAILED DESCRIPTION OF PREFERRED EMBODIMENTS

Figure 1A:
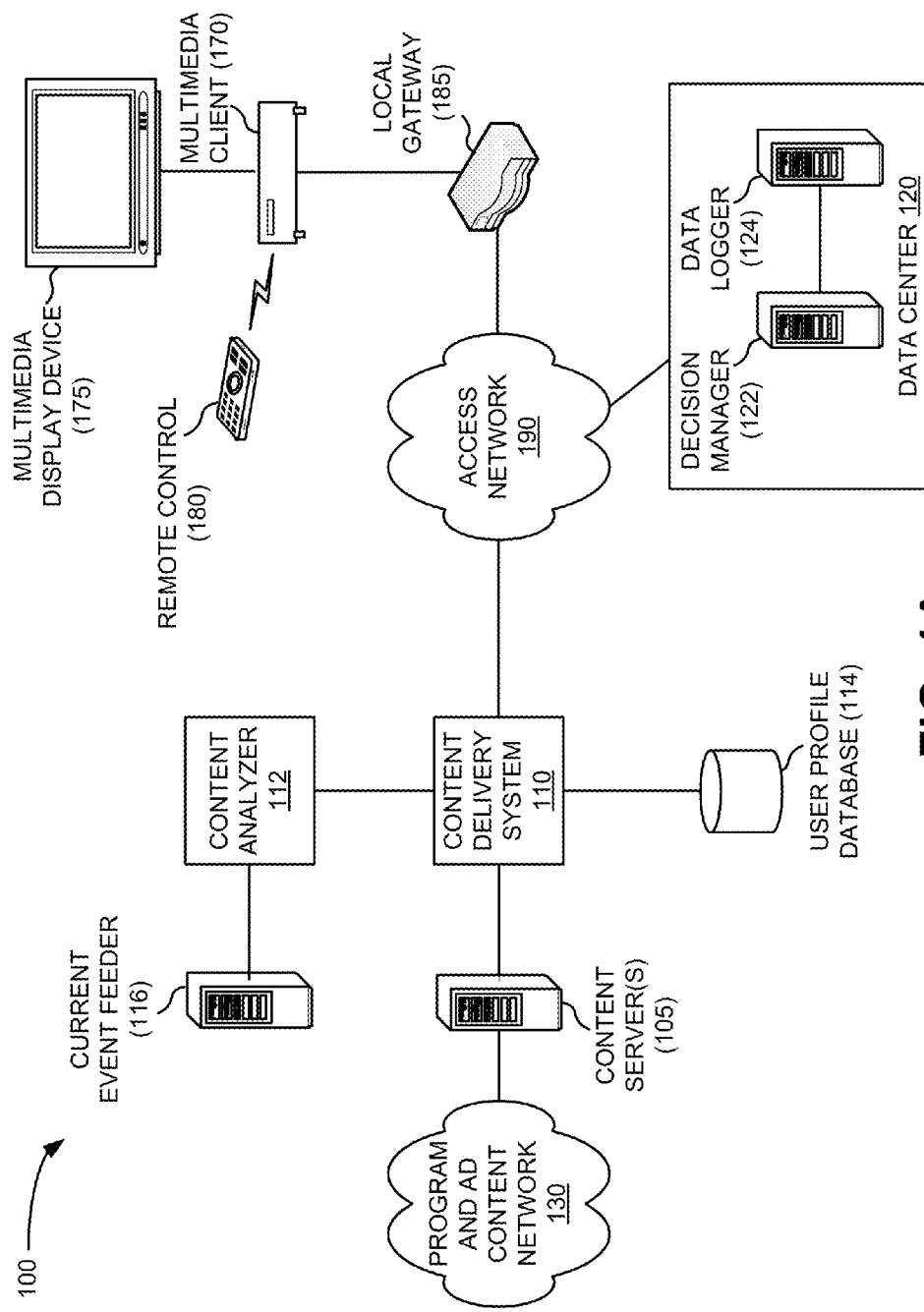

The following detailed description refers to the accompanying drawings. The same reference numbers in different drawings may identify the same or similar elements. Also, the following detailed description does not limit the invention.

Implementations described herein may provide systems and/or methods that may provide viewers with advertisements based on the content of currently viewed programming. The systems and/or methods may combine information regarding current programming, available advertising, viewer profiles, and/or current events to determine which advertisements may be shown to particular viewers at any given time. As an illustration, an advertisement for sterile masks might be shown to a viewer during or immediately following a newscast on the spread of a flu virus. As another illustration, an advertisement for a product endorsed by a particular celebrity can be shown to a viewer during or immediately following programming involving the celebrity.

Thus, for any given advertising timeslot in program content, a multimedia client may combine information of the current programming with real-time (or near real-time) data/instructions to make an advertisement selection. In one implementation, the selection decision may be further enhanced by including viewer profile information and/or observations of the viewer's behavior (e.g., the viewer's use of remote control functions). Additionally, as described further herein, advertisement availability and selections can be continuously updated (e.g., via in-band insertion of advertisement identifiers and/or keywords for available advertisements). In some implementations, selected advertisements may be retrieved and/or stored by a multimedia client in advance of an advertising timeslot. In other implementations, selected advertisements may be requested by the multimedia client in real time.

As described further herein, advertisement selection may be based on keywords obtained from programming content. As used herein, the term "keyword" may include data associated with program content used to influence selections of advertising. Keywords may be obtained, or example, from metadata (e.g., descriptor bits) embedded in program content feeds and/or by processing program content (e.g., via speech recognition, image recognition, and/or parsing captioning). Keywords may be single words (or alpha-numeric strings) or select combinations of words. In some implementations, keywords may correspond to particular search algorithms (e.g., particular portions of words, words near each other, multiple instances of a word, etc.).

As used herein, the term "multimedia client" may refer to any media processing device that may receive multimedia content (e.g., video, audio, games, etc.) over a network, and may provide such multimedia content to an attached multimedia display device (such as a television or computer monitor). A "subscription multimedia service," as used herein, may refer to television, telephone, networking and/or other multimedia services provided to customers over a closed distribution network, such as cable, optical fiber, satellite, or virtual private networks. Also, as used herein, the terms "user," "viewer," "subscriber," and "customer" may refer interchangeably to a person who interacts with, orders, uploads, listens to, and/or plays multimedia content of a subscription multimedia service.

FIGS. 1A and 1B provide a diagram of an exemplary network 100 in which systems and/or methods described herein may be implemented. Referring collectively to FIGS. 1A and 1B, network 100 may include a content server 105, a content delivery system 110 that may be connected with a content analyzer 112 and a user profile database 114, a current events feeder 116, a data center 120 that includes a decision manager 122 and a data logger 124, a program and advertising ("ad") content network 130 that includes, as shown in FIG. 1B, a linear advertising content database 135, an non-linear advertising content database 140, advertising sources 145, a linear program content database 150, an interactive program content database 155, content sources 160, a multimedia client 170, a multimedia display device 175, a remote control 180, a local gateway 185, and an access network 190. Multimedia client 170, multimedia display device 175, remote control 180, and local gateway 185 may be located on a customer's premises and may be connected via access network 190 to content delivery system 110 and/or data center 120 located at, for example, a subscription multimedia service provider's premises. Components of network 100 may interconnect via wired and/or wireless connections.

For simplicity, one content server 105, one content delivery system 110, content analyzer 112, one user profile database 114, one current events feeder 116, one data center 120, one decision manager 122, one data logger 124, one program and advertising content network 130, one linear advertising content database 135, one non-linear advertising content database 140, one set of advertising sources 145, one linear program content database 150, one interactive program content database 155, one set of content sources 160, one multimedia client 170, one multimedia display device 175, one remote control 180, one local gateway 185, and one access network 190 have been illustrated in FIGS. 1A and 1B. In practice, there may be additional content servers 105, content delivery systems 110, content analyzers 112, user profile databases 114, current events feeders 116, data centers 120, decision managers 122, data loggers 124, program and advertising content network 130, linear advertising content databases 135, non-linear advertising content databases 140, sets of advertising sources 145, linear program content databases 150, interactive program content databases 155, sets of content sources 160, multimedia clients 170, multimedia display devices 175, remote controls 180, local gateways 185, and access networks 190. Also, in some instances, one or more of the components of network 100 may perform one or more functions described as being performed by another one or more of the components of network 100.

Content server 105 may include one or more devices for providing content/information to multimedia client 170 and/or multimedia display device 175 in accordance with requests that are issued from multimedia client 170. Examples of content server 105 may include a headend device that provides pay-per-view (PPV) events, a video-on-demand (VOD) device or another device that provides multimedia content upon request, an advertising server that provides advertising associated with multimedia content, and/or a program guide information server that provides information related to multimedia content available to multimedia client 170. Content server 105 may communicate with a variety of other components within network 100, such as devices within content delivery system 110, linear advertising content database 135, non-linear advertising content database 140, linear program content database 150, and interactive program content database 155 to provide requested multimedia services to customers. In one implementation, content server 105 may retrieve advertising content that has been specifically requested by multimedia client 170 and/or decision manager 122 based on program content provided to multimedia client 170. While shown as a single server device in FIG. 1A, in other implementations, content server 105 may be distributed among multiple server devices.

Content delivery system 110 may include one or more devices to deliver broadcast and other multimedia content to multimedia client 170. In general, content delivery system 110 may provide control over (e.g., via access network 190) television services for devices, such as multimedia clients 170, multimedia display devices 175, and/or other network connectivity devices (e.g., personal computers, not shown) provided at the customer's premises. Content delivery system 110 may include, for example, video hub offices (VHOs), databases, gateways, servers, network switches, and/or routers that may be connected by wired and/or wireless connections. Content delivery system 110 may serve as a link between a multimedia client 170 and content server 105 to enable delivery of on-demand multimedia content, advertising, applications, etc. Content delivery system may also supply broadcast programming (e.g., television network programs, live events, etc.) to multimedia client 170. For example, content delivery system 110 may facilitate communications between content server 105 and multimedia client 170 via access network 190. In one implementation, content delivery system 110 may combine broadcast programming content with advertising content (retrieved, e.g., from content server 105) to provide a combined linear content/advertising stream to multimedia client 170. In some implementations, content delivery system 110 may also collect information from multimedia clients 170 that may be used, for example, to generate user profiles (which may be stored in user profile database 114).

Content analyzer 112 may include one or more computation or communication devices, that gather, process, search, and/or provide information in a manner described herein. Content analyzer 112 may store a list of keywords that may be used to associate program content with advertising content. Content analyzer 112 may receive content/information from content delivery system 110 that is directed to multimedia client 170. In one implementation, content analyzer 112 may receive linear and/or interactive program content that includes particular keywords that may be used to associate advertisements with the linear and/or interactive program content. In another implementation, content analyzer 112 may include processing logic to parse keywords from images, audio feeds, and/or closed captioning associated with the linear and/or interactive program content. Content analyzer 112 may also receive current events feeds from another source, such as current events feeder 116. Content analyzer 112 may use information from current events feeder 116, for example, to alter the stored list of keywords and/or to alter keyword identification processes. While content analyzer 112 is shown as a separate component connected to content deliver system 110 in FIG. 1A, in other implementations, content analyzer 112 may be integrated within content delivery system 110, data center 120, multimedia client 170, another component of network 100, or distributed among a combination of components.

User profile database 114 may include one or more devices for storing data for multimedia client 170 or groups of multimedia clients that may be used to provide targeted advertising. For example, advertisements may be assigned a unique advertising identifier that may be cross-referenced to particular demographics, interests, or other indicators that may be obtained from user profiles. Advertisers may classify particular advertising content to identify demographic groups, common interests, and/or other information that can be used in determining particular multimedia clients 170 (or groups of multimedia clients) to which to direct the advertising content. Content delivery system 110 may retrieve user profile information from user profile database 114 and retrieve advertising content from content server 105 that has been classified to correspond to the user profile tendencies. In an exemplary implementation, the viewer activities, such as responses to interactive advertising and/or channel selections to tune away from advertisements, may be tracked and used by advertisers to identify viewer preferences and provide more sophisticated targeted advertising.

Current events feeder 116 may include one or more server devices, or other types of computation or communication devices, that gather, process, search, and/or provide information in a manner described herein. Current events feeder 116 may provide information such as additional keywords and/or specific instructions regarding selections of advertisements. In some implementations, current events feeder 116 may also provide updates of advertisement availability (e.g., new and/or deleted advertisements from a list of candidate advertisements).

Data center 120 may include one or more devices that are capable of collecting data and performing statistical analysis on user activity of multimedia client 170 and other multimedia clients. Data center 120 may combine related data into groups of accounts based on, for example, pattern analysis and correlation. In implementations described herein, data center 120 may include decision manager 122 and data logger 124.

Decision manager 122 may include one or more server devices, or other types of computation or communication devices, that gather, process, search, and/or provide information in a manner described herein. Decision manager 122 may receive (e.g., from content analyzer 112) keywords regarding current program content being provided via content delivery system 110 and may determine appropriate advertising content based on the keywords and other factors. Decision manager 122 may also retrieve user profile information from user profile database 114 and/or notifications of user activity from multimedia client 170. In one implementation, decision manager 122 may apply keywords received from content analyzer 112 to a set of advertising rules and/or user profile information to select an advertisement from a group of available advertisements. Advertising rules and a list of advertisements may be stored, for example, within a memory of decision manager 122. The list of advertisements may include descriptive information, such a a category, advertiser, length, title, and unique identifier that can allow decision manager 112 to associate advertisements with keywords, current events, and/or user profile information. Available advertisements from the list of advertisements may be determined based on, for example, time of day, channel being viewed, restrictions dictated by advertisers (e.g., not to advertise during particular programs/channels, etc.), restrictions dictated by a multimedia service provider (e.g., number of repeat advertisements, etc.), etc. While decision manager 122 is shown as a separate component in FIG. 1A, in other implementations, decision manager 122 may be integrated within content delivery system 110, content analyzer 112, multimedia client 170, another component of network 100, or distributed among a combination of components.

Data logger 124 may include one or more devices that maintain a selection history of advertisements selected by decision manager 122 for multimedia client 170. In one implementation, data logger 124 may include a database of exemplary fields, such as a multimedia client identifier, a user account identifier (e.g., for a particular user of a multimedia client), a date field, a time field, one or more advertisement code(s) fields, and/or a program identification field (e.g., the current program at the time an advertisement was selected). Data logger 124 may include multiple databases stored locally at data center 120 and/or stored at one or more different and possibly remote locations. Data logger 124 may group selection histories for multimedia clients, for example, by individual users, user groups, product type, etc. Information from data logger 124 may be retrieved by a backend server (or another server device) within, for example, content delivery system 110 to monitor advertising data, such as viewer response rates, revenue, etc.

Program and advertising content network 130 may include multiple components to provide information to content servers 105. As shown in FIG. 1B, program and advertising content network 130 may include linear advertising content database 135, non-linear advertising content database 140, advertising sources 145, linear program content database 150, interactive program content database 155, and content sources 160. Linear advertising content database 135 may include one or more devices that receive and maintain linear advertising content from advertising sources 145. Linear advertising content may include, for example, advertising content that may be inserted within a break in linear programming (e.g., a conventional commercial break in broadcast television programming). Non-linear advertising content database 140 may include one or more devices that receive and maintain non-linear advertising content from advertising sources 145. Non-linear advertising content may include, for example, passive and/or interactive advertising that may be presented, for example, based directly or indirectly on user input to multimedia client 170. Non-linear advertising may include, for example, interactive applications, widgets, banners, and/or other multimedia that may not be time-restricted.

Advertising sources 145 may include one or more server devices, or other types of computation or communication devices, that gather, process, search, and/or provide information in a manner described herein. Advertising sources 145 may provide linear and interactive advertising content to linear advertising content database 135 and/or non-linear advertising content database 140. Advertising content may include a variety of formats, including, for example, linear and/or interactive video, images, banners/overlays, interactive (e.g., clickable) advertisements, etc. In an exemplary implementation, advertising sources 145 may be controlled by one or more different devices than the device(s) that controls linear advertising content database 135 and/or non-linear advertising content database 140 (e.g., the subscription multimedia service provider).

Linear program content database 150 and interactive program content database 155 may each include one or more devices that receive and maintain linear program content and interactive program content, respectively, from content sources 160. Linear program content may include, for example, video-on-demand programming. Interactive program content may include non-linear programming that may be selected and/or controlled by a user, such as interactive applications, games, etc.

Content sources 160 may include one or more server devices, or other types of computation or communication devices, that gather, process, search, and/or provide information in a manner described herein. Content sources 160 may provide linear and interactive program content to linear program content database 150 and/or interactive program content database 155. In an exemplary implementation, content sources 160 may be controlled by one or more different devices than the device(s) that controls linear program content database 150 and/or interactive program content database 155 (e.g., the subscription multimedia service provider).

Returning to FIG. 1A, multimedia client 170 may include any device capable of receiving, transmitting and/or processing information to and/or from access network 190. In one implementation, multimedia client 170 may be a closed device (e.g., including a hardware/software configuration that is not accessible to the general public). Multimedia client 170 may provide video signals to multimedia display device 175. Examples of multimedia client 170 may include a set-top box, a computer, a cable card, and a portable electronic device. Multimedia client 170 may receive a television signal from gateway 185, may convert the signal to a form usable by multimedia display device 175, and may transmit the signal to multimedia display device 175 for display. Multimedia client 170 may further allow a user to provide user input for interactive television applications (e.g., to navigate menu displays and/or select menu items) and to alter the programming provided to multimedia display device 175 based on a signal (e.g., a channel up or channel down signal) received from, for example, remote control 180. In one implementation, multimedia client 170 may support interfaces using Enhanced TV Binary Interchange Format (EBIF). Multimedia client 170 may also send data of user interaction to a backend server (e.g., content server 105, decision manager 122, and/or a device within content delivery system 110) via access network 190.

In an exemplary implementation, multimedia client 170 may also include an integrated digital video recorder (DVR) or other memory device that may enable multimedia client 170 to store advertising content for later retrieval/presentation to a user based on, for example, keywords identified by content analyzer 112. In some implementations, multimedia client 170 may be incorporated within multimedia display device 175. Multimedia client 170 may retrieve and display advertising content during designated breaks in program content and/or during the display of program content (e.g., as an overlay or separate window). In one implementation, content analyzer 112 may be included within multimedia client 170 to identify keywords of current programming (e.g., programming being viewed on multimedia display device 175 or recorded by multimedia client 170 and/or another device).

Multimedia display device 175 may include a digital or analog display via which a user may view multimedia content (including, for example, conventional programming, interactive displays, and/or advertising). Multimedia display device 175 may refer to any device that can receive and display multimedia content delivered over access network 190 and/or through multimedia client 170 for perception by users. Multimedia display device 175 may include technologies, such as cathode ray tube (CRT) displays, liquid crystal displays (LCDs), light-emitting diode (LED) displays, plasma displays, etc.

Remote control 180 may include a range of devices including function specific keys, number keys, and/or a full-text key pad. A user may interact with multimedia client 170 using a keypad that is part of remote control 180, and signals representing key depressions may be transmitted to multimedia client 170 via an infrared transmission or another type of transmission. Remote control 180 may allow a user to navigate a program guide, select channels or programs for viewing, adjust display characteristics, and/or perform other interactive functions related to viewing multimedia-type content provided over a network. In one implementation, multimedia client 170 may allow a user to provide input to interactive advertising via remote control 180.

Local gateway 185 may include a network device that provides an interface from access network 190 to multimedia clients 170 and/or other network connectivity devices (not shown). For example, when telecommunication services are provided to a customer's premises via an optical fiber, gateway 185 may include an optical network terminal (ONT) that connects to the optical fiber. The ONT may convert between signals appropriate for multimedia display device 175 and signals appropriate for transmission over optical fiber. For example, the ONT may include a coaxial cable connection that leads to multimedia display device 175 or multimedia client 170. The ONT may also include an Ethernet output port that connects to a personal computer or a voice over Internet protocol (VoIP) telephone and/or a standard telephone port for connecting to a standard telephone. Gateway 185 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Access network 190 may include a video signaling and distribution network and system that permit transfer of data between backend servers and multimedia clients 170. Additionally, access network 190 may include, among other things, a firewall, a filtering mechanism, a proxy, and/or network address translation mechanisms. Access network 190 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 190 may provide customers with multimedia content provided, for example, by content server 105 and/or content delivery system 110.

In implementations described herein, a user may select program content (e.g., on-demand content, broadcast content, etc.) that may be provided to multimedia client 170 via content delivery system 110. The program content may include breaks for advertising. In advance of an advertising break, content analyzer 112 may identify keywords in the currently selected program content and provide the keywords (along with an indication of the multimedia client(s) 170 with which the keyword is associated) to decision manager 122. Decision manager 122 may apply the keywords, user profile information, and/or current events current events information to select one or more advertisements for the upcoming programming break. Decision manager 122 may provide instructions to multimedia client 170 and/or content delivery system 110 to retrieve advertising content for the selected advertisements. In one implementation, multimedia client 170 may pre-fetch some or all advertisements (e.g., from content server 105) that are available for selection in the upcoming break and store the advertisements in local memory. In another implementation, multimedia client 170 may retrieve some or all of the selected (or default) advertisements in real time from content server 105/content delivery system 110.

Figure 2:
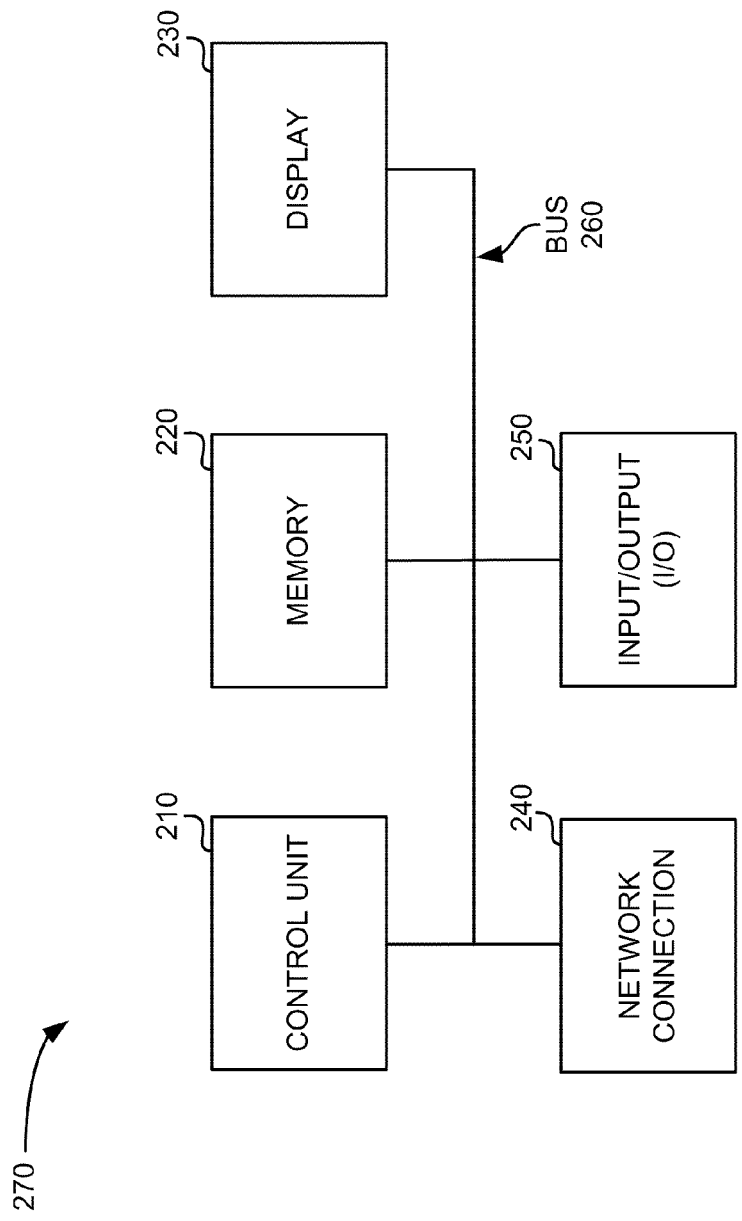
FIG. 2 is a block diagram of exemplary components of a multimedia client that may be used in the network of FIGS. 1A and 1B.

FIG. 2 is diagram illustrating exemplary components of multimedia client 170. As shown, multimedia client 170 may include a control unit 210, a memory 220, a display 230, a network connection 240, an input/output (I/O) component 250, and a bus 260.

Control unit 210 may include one or more processors, microprocessors, or another type of processing logic that interprets and executes instructions. Among other functions, control unit 210 may execute instructions to present indictors of upcoming advertisements and receive viewer input to alter the scheduled list of advertisements. Control unit 210 may also collect and store viewer input associated with television programming/advertising. Control unit 210 may execute instructions to send viewer input to one or more other devices, such as data center 120. Control unit 210 may also receive information and/or instructions from other devices, such as decision manager 122 and/or content delivery system 110.

Memory 220 may include one or more dynamic or static storage devices that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store a viewer activity log to send at a later point in time, such as when requested by decision manager 122.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), images, and/or video information. Display 230 may be an optional component.

Network connection 240 may include any transceiver-like mechanism that enables multimedia client 170 to communicate with other devices and/or systems, such as content server 105 and/or decision manager 122. For example, network connection 240 may include an Ethernet interface, an optical interface, a coaxial interface, a radio interface, or the like. Network connection 240 may allow for wired and/or wireless communication. Network connection 240 may be configured to connect multimedia client 170 to a packet-based IP network.

Input/output devices 250 may generally include user input devices such as external buttons, and output devices, such as LED indicators. With input/output devices 250, a user may generally interact with multimedia client 170. In some implementations, input/output devices 250 may be implemented via a remote control (e.g., remote control 180). Bus 260 may provide an interface through which components of multimedia client 170 can communicate with one another.

As will be described in detail below, multimedia client 170 may perform certain operations relating to displaying information and communicating viewer activities to a server, such as decision manager 122. Multimedia client 170 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices. The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of multimedia client 170, in other implementations, multimedia client 170 may include fewer, different, differently arranged, or additional components than those depicted in FIG. 2. In still other implementations, one or more components of multimedia client 170 may perform one or more other tasks described as being performed by one or more other components of multimedia client 170.

Figure 3:
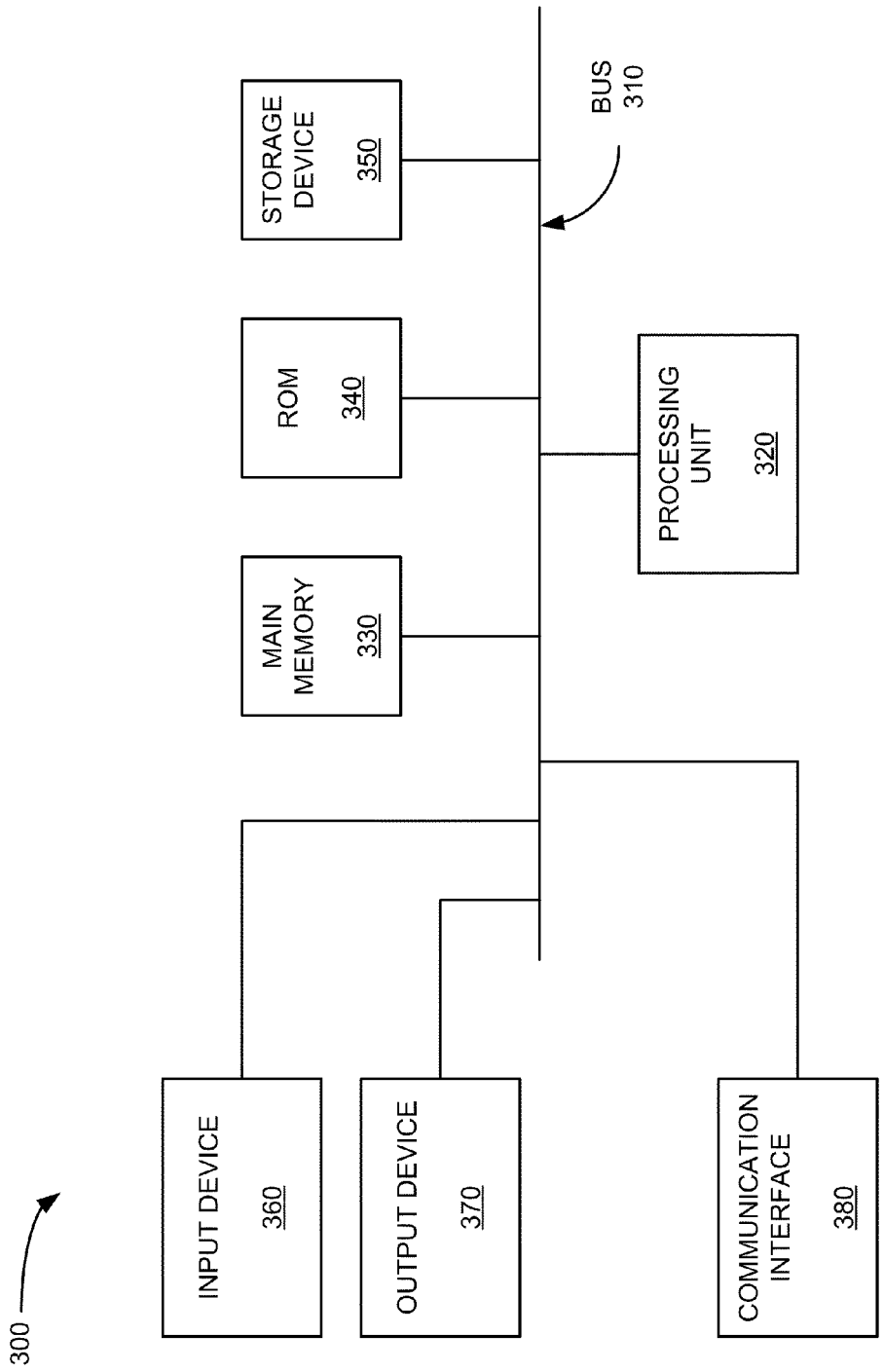
FIG. 3 is a block diagram of exemplary components of a device that may correspond to a content server, a content analyzer, a current events feeder, and/or a decision manager of FIGS. 1A and 1B.

FIG. 3 is a diagram of exemplary components of a device 300 that may correspond to content server 105, content analyzer 112, current events current events feeder 116, and/or decision manager 122. In some implementations, device 300 may also correspond to one or more of data logger 124, advertising sources 145, content sources 160, and certain components of content delivery system 110. As illustrated, device 300 may include a bus 310, a processing unit 320, a main memory 330, a ROM 340, a storage device 350, an input device 360, an output device 370, and a communication interface 380.

Bus 310 may include a path that permits communication among the components of device 300. Processing unit 320 may include one or more processors, microprocessors, or other types of processing units, such as application-specific integrated circuits (ASICs), field-programmable gate arrays (FPGAs), etc., that may interpret and execute instructions.

Main memory 330 may include a RAM or another type of dynamic storage device that stores information and instructions for execution by processing unit 320. ROM 340 may include a ROM device or another type of static storage device that may store static information and instructions for use by processing unit 320. Storage device 350 may include a magnetic and/or optical recording medium and its corresponding drive. In one implementation, storage device may include a database. Storage device 350 may store viewer transaction history for particular multimedia clients 170 or all multimedia clients 170 associated with a subscription multimedia service provider.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a speaker, etc. Communication interface 380 may include any transceiver-like mechanism that enables device 300 to communicate with other devices and/or systems, such as multimedia client 170.

As will be described in detail below, device 300 may perform certain operations associated with providing real time advertisement shaping for a subscription multimedia service. Device 300 may perform these and other operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. In still other implementations, one or more components of device 300 may perform one or more other tasks described as being performed by one or more other components of device 300.

Figure 4:
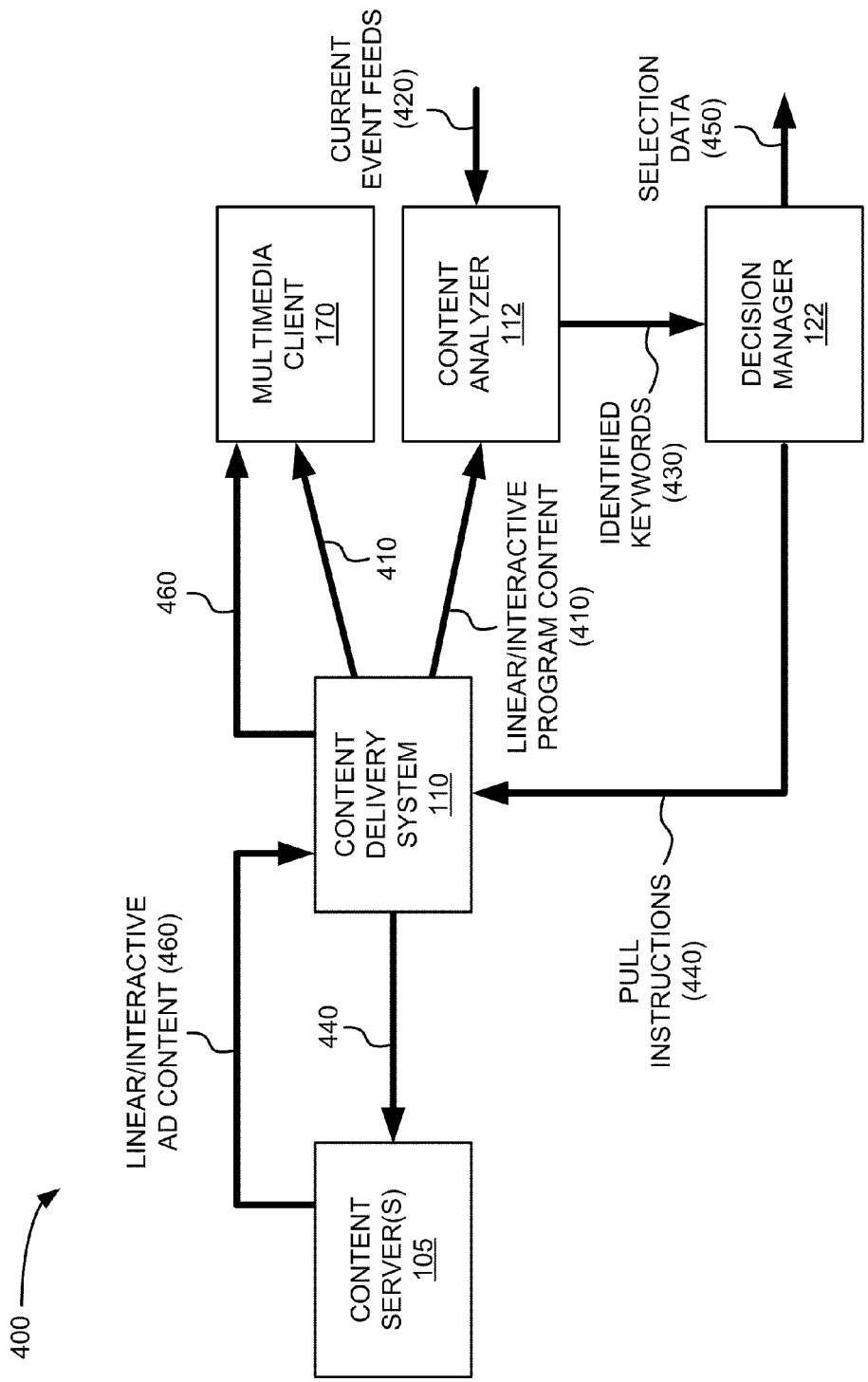
FIG. 4 depicts a diagram of exemplary interactions among components of an exemplary portion of the network illustrated in FIGS. 1A and 1B.

FIG. 4 depicts a diagram of exemplary interactions among components of an exemplary portion 400 of network 100. As illustrated, exemplary network portion 400 may include content server 105, content delivery system 110, content analyzer 112, decision manager 122, and multimedia client 170. Content server 105, content delivery system 110, content analyzer 112, decision manager 122, and multimedia client 170 may include the features described above in connection with, for example, FIGS. 1A-3.

As further shown in FIG. 4, content delivery system 110 may provide linear and/or interactive program content 410 to content analyzer 112 and to multimedia client 170. Linear and/or interactive program content 410 may include, for example, content retrieved from content server 105 and/or broadcast content retrieved by content delivery system 110. Linear and/or interactive program content 410 may also include dedicated space/time for advertising. For example, linear and/or interactive program content 410 may include breaks in linear programming into which advertising segments may be inserted. As another example, interactive programming may include dedicated screen space and/or triggers for advertising content. In one implementation, linear and/or interactive program content 410 may include metadata embedded within the program feed. The metadata may include keywords that may be used to match advertising with content of linear and/or interactive program content 410. In another implementation, linear and/or interactive program content 410 may include an audio component or captioning that may be scanned for keywords. Captioning may refer to text or subtitles provided either as part of linear and/or interactive program content 410 or as a separately transcribed feed, such as closed captioning service, that is associated with linear and/or interactive program content 410.

Multimedia client 170 may receive linear and/or interactive program content 410 and present linear and/or interactive program content 410 to a viewer (e.g., via display 175). Content analyzer 112 may also receive linear and/or interactive program content 410. While distribution of linear and/or interactive program content 410 is shown as two separate feeds in FIG. 4, content analyzer 112 may analyze the same feed of linear and/or interactive program content 410 in certain arrangements of network 100.

Content analyzer 112 may identify keywords within linear and/or interactive program content 410. For example, content analyzer 112 may parse one or more keywords from metadata embedded within linear and/or interactive program content 410. Additionally and/or alternatively, content analyzer 112 may process program content to identify keywords using, for example, speech recognition applied to program audio or searching for terms in associated closed captioning content. In one implementation, content analyzer 112 may be provided with a list of keywords for advertisements that content analyzer 112 may cross-reference against linear and/or interactive program content 410. Content analyzer 112 may also receive current events feeds 420 from a network server, such as current events feeder 116. Current events feeds 420 may include additional keywords and/or instructions regarding advertising selections. In one implementation, current events feeds 420 may include instructions for weighting/prioritizing among multiple keywords identified in linear and/or interactive program content 410.

Keywords identified by content analyzer 112 may be forwarded to decision manager 122, as indicated by reference number 430. Identified keywords 430 may also include information identifying, for example, the linear and/or interactive program content 410 from which the keywords were obtained and what multimedia client(s) 170 are receiving the linear and/or interactive program content 410. Identified keywords 430 may also include, for example, priority information and/or additional criteria supplied by current events feeds 420.

Decision manager 122 may receive identified keywords 430 and identify advertisements consistent with identified keywords 430 and any additional data supplied by content analyzer 112. Decision manager 122 may direct that particular advertising content be supplied to multimedia client 170 based on the identified keyword 430. For example, decision manager 122 may send pull instructions 440 to content delivery system 110 to instruct content delivery system 110 to pull advertising media (e.g., a linear advertisement or an interactive advertisement) from content server 105. Pull instructions 440 may include, for example, a unique advertising identifier for the selected advertisements, timeslot assignments, and/or a multimedia client identifier. Alternatively and/or additionally, pull instructions from decision manager 122 may be provided to multimedia client 170. As indicated by reference number 450, decision manager 122 may also send advertisement selection data to another location, such as data logger 124, for storage and later analysis.

Content delivery system 110 may forward pull instructions 440 to content server(s) 105 to retrieve selected advertisements. In response to pull instructions 440, content server(s) 105 may provide the particular linear and/or interactive advertising content 460 (e.g., from linear advertising content database 135 and/or non-linear advertising content database 140) to multimedia client 170 via content delivery system 110. In one implementation, content delivery system 110 may insert the selected linear and/or interactive advertising content 460 into appropriate breaks in the linear and/or interactive program content 410. In another implementation, content delivery system may supply the selected linear and/or interactive advertising content 460 to multimedia client 170 to store the advertising content 460 locally (e.g., within memory 220) for insertion during a subsequent break in program content.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
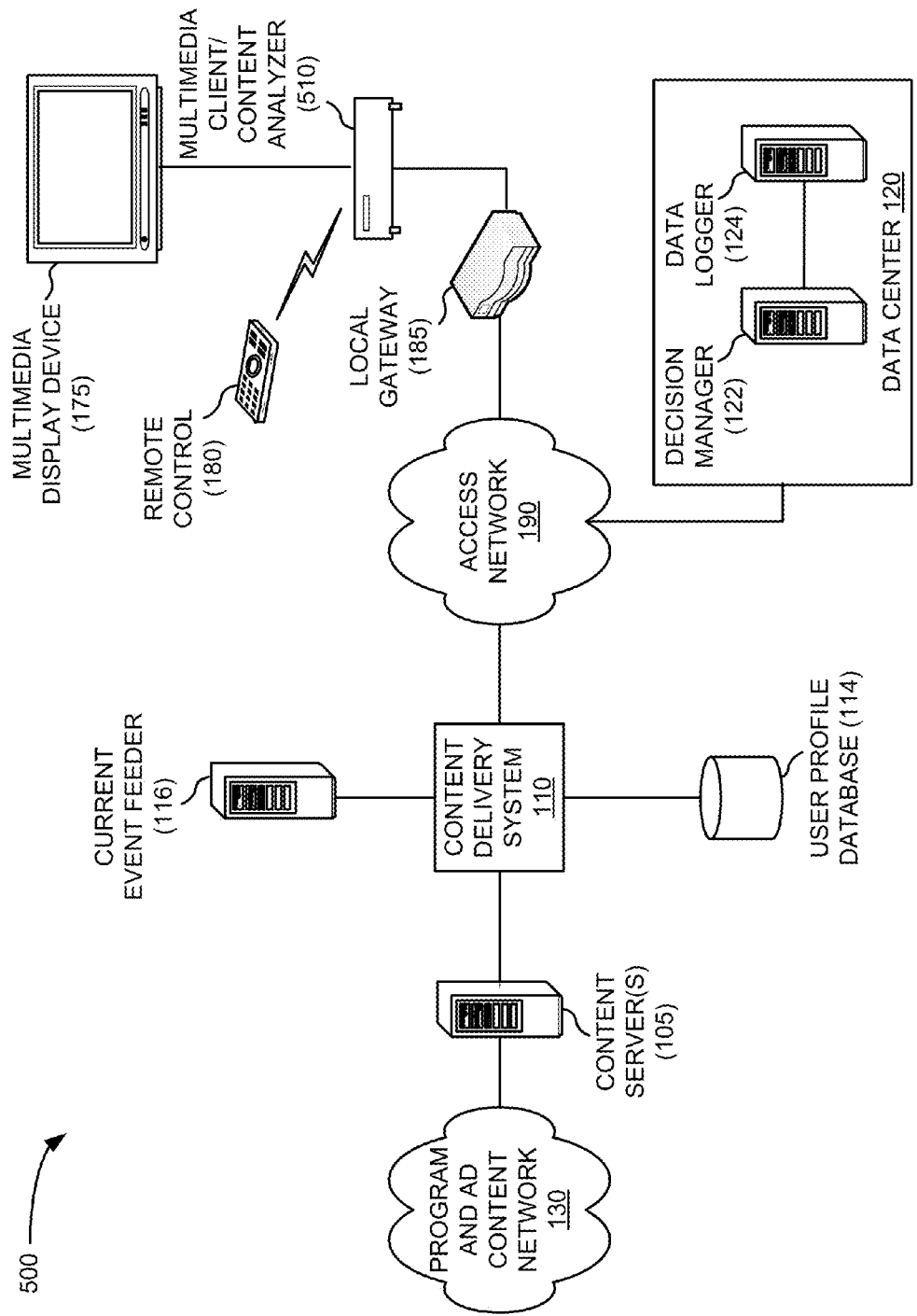
FIG. 5 depicts another exemplary network in which systems and/or methods described herein may be implemented.

FIG. 5 provides a diagram of another exemplary network 500 in which systems and/or methods described herein may be implemented. As shown in FIG. 5, network 500 may include content server 105, content delivery system 110 that may be connected with user profile database 114 and current events feeder 116, data center 120 that includes decision manager 122 and data logger 124, program and advertising ("ad") content network 130, multimedia client/content analyzer 510, multimedia display device 175, remote control 180, local gateway 185, and access network 190.

For simplicity, one content server 105, one content delivery system 110, one user profile database 114, one current events feeder 116, one data center 120, one decision manager 122, one data logger 124, one program and advertising content network 130, one multimedia client/content analyzer 510, one multimedia display device 175, one remote control 180, one local gateway 185, and one access network 190 have been illustrated in FIG. 5. In practice, there may be additional content servers 105, content delivery systems 110, user profile databases 114, current events feeders 116, data centers 120, decision managers 122, data loggers 124, program and advertising content networks 130, multimedia client/content analyzers 510, multimedia display devices 175, remote controls 180, local gateways 185, and access networks 190. Also, in some instances, one or more of the components of network 100 may perform one or more functions described as being performed by another one or more of the components of network 500. Content server 105, content delivery system 110, user profile database 114, current events feeder 116, data center 120, decision manager 122, data logger 124, program and advertising content network 130, multimedia display device 175, remote control 180, local gateway 185, and access network 190 may include the features described above in connection with, for example, FIGS. 1A-3.

Multimedia client/content analyzer 510 may include any device capable of receiving, transmitting and/or processing information to and/or from access network 190. In one implementation, multimedia client/content analyzer 510 may be a closed device (e.g., including a hardware/software configuration that is not accessible to the general public). Multimedia client/content analyzer 510 may receive a television signal from gateway 185, may convert the signal to a form usable by multimedia display device 175, and may transmit the signal to multimedia display device 175 for display. Multimedia client/content analyzer 510 may further allow a user to provide user input for interactive television applications (e.g., to navigate menu displays and/or select menu items) and to alter the programming provided to multimedia display device 175 based on a signal (e.g., a channel up or channel down signal) received from, for example, remote control 180. Multimedia client/content analyzer 510 may also send data of user interaction to a backend server (e.g., content server 105, decision manager 122, and/or a device within content delivery system 110) via access network 190.

Multimedia client/content analyzer 510 may also store a list of keywords that may be used to associate program content with advertising content. In one implementation, multimedia client/content analyzer 510 may receive linear and/or interactive program content that includes particular keywords that may be used to associate advertisements with the linear and/or interactive program content. In another implementation, multimedia client/content analyzer 510 may include processing logic to parse keywords from images, audio feeds, and/or closed captioning associated with the linear and/or interactive program content. Multimedia client/content analyzer 510 may also receive current events feeds from current events feeder 116 (e.g., via content delivery system 110). Information from current events feeder 116 may, for example, alter the stored list of keywords and/or provide specific instructions regarding advertisement selection. Multimedia client/content analyzer 510 may retrieve and display advertising content during designated breaks in program content and/or during the display of program content (e.g., as an overlay or separate window).

In implementations described herein, a viewer may select program content (e.g., on-demand content, broadcast content, etc.) that may be provided to multimedia client/content analyzer 510 via content delivery system 110. The program content may include breaks for advertising. In advance of an advertising break, multimedia client/content analyzer 510 may identify keywords in the currently selected program content and provide the keywords to decision manager 122. Decision manager 122 may apply the keywords, along with user profile information retrieved from user profile database 114 and/or current events information, to select one or more advertisements for the upcoming programming break. Decision manager 122 may provide instructions to multimedia client/content analyzer 510 to retrieve the selected advertisements. In one implementation, multimedia client/content analyzer 510 may pre-fetch some or all advertisements (e.g., from content server 105) that are available for selection in the upcoming break and store the advertisements in local memory. In another implementation, multimedia client/content analyzer 510 may retrieve some or all of the selected (or default) advertisements in real time from content server 105/content delivery system 110.

Figure 6:
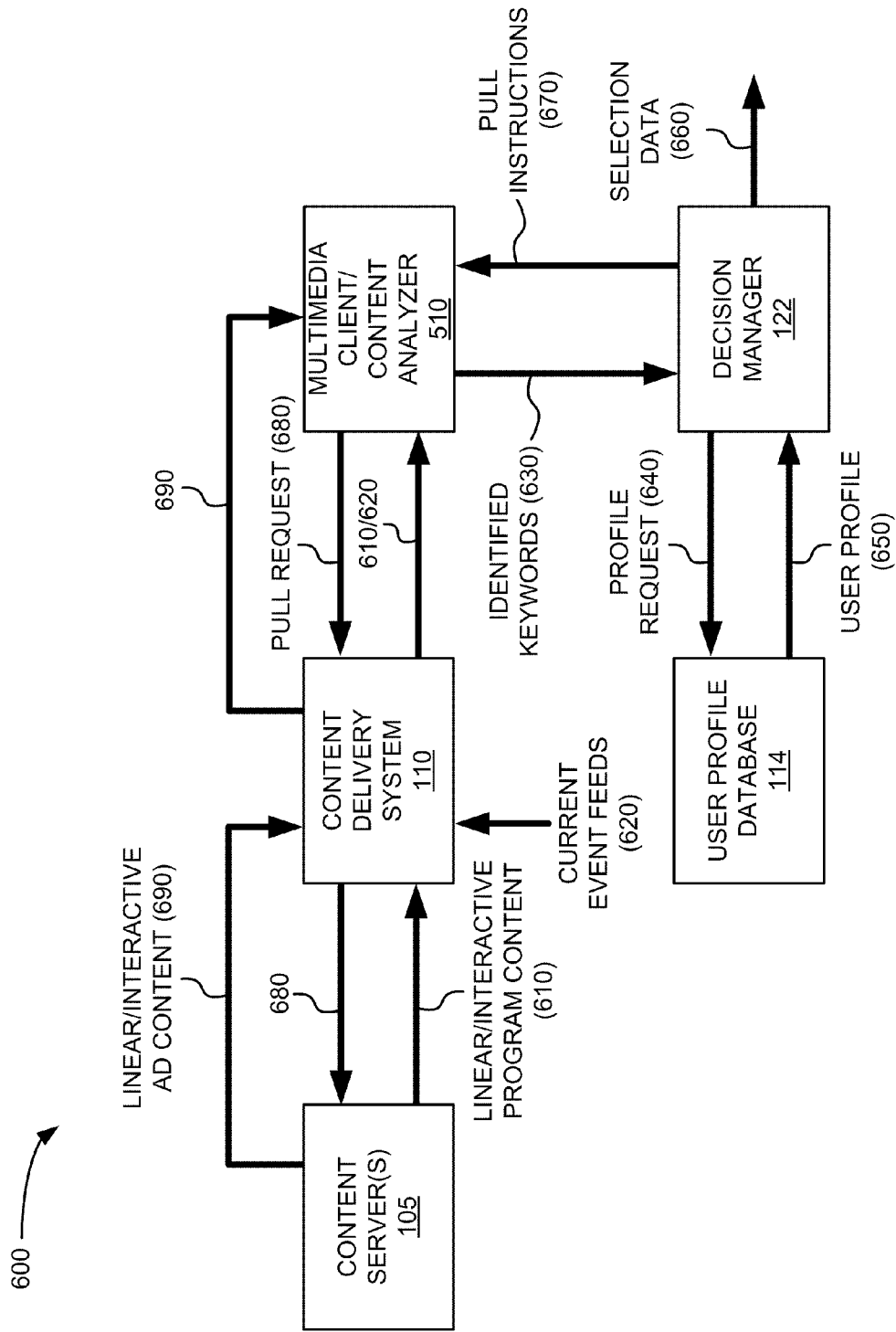
FIG. 6 depicts a diagram of exemplary interactions among components of an exemplary portion of the network illustrated in FIG. 5.

FIG. 6 depicts a diagram of exemplary interactions among components of an exemplary portion 600 of network 100. As illustrated, exemplary network portion 600 may include content server 105, content delivery system 110, multimedia client/content analyzer 510, user profile database 114, and decision manager 122. Content server 105, content delivery system 110, user profile database 114, and decision manager 122 may include the features described above in connection with, for example, FIGS. 1A-4. Multimedia client/content analyzer 510 may include the features described above in connection with, for example, FIG. 5.

As further shown in FIG. 6, content server(s) 105 may provide (via content delivery system 110) linear and/or interactive program content 610 to multimedia client/content analyzer 510. Linear and/or interactive program content 610 may include, for example, content requested by a user of multimedia client/content analyzer 510 (e.g., on-demand programming, etc.). Linear and/or interactive program content 610 may include dedicated space and/or time slots for advertising. For example, linear and/or interactive program content 610 may include breaks in linear programming or dedicated screen space into which advertising segments may be inserted. In one implementation, linear and/or interactive program content 610 may include metadata embedded within the program feed. The metadata may include keywords that may be used to match advertising with content of linear and/or interactive program content 610. In another implementation, linear and/or interactive program content 610 may include images, an audio component, or captioning that may be scanned for keywords.

Content delivery system 110 may also receive current events feeds 620 from a network server, such as current events feeder 116. Current events feeds 620 may include additional keywords and/or instructions regarding advertising selections. In one implementation, current events feeds 620 may include instructions for weighting/prioritizing among multiple keywords identified in linear and/or interactive program content 610.

Multimedia client/content analyzer 510 may receive linear and/or interactive program content 610 and current events feeds 620 from content delivery system 110. Multimedia client/content analyzer 510 may present linear and/or interactive program content 610 to a viewer (e.g., via display 175). Multimedia client/content analyzer 510 may also identify keywords within linear and/or interactive program content 610. For example, multimedia client/content analyzer 510 may parse one or more keywords from metadata embedded within linear and/or interactive program content 610. In other examples, multimedia client/content analyzer 510 may identify keywords from speech recognition of an audio component of linear and/or interactive program content 610, may identify images from a video component of linear and/or interactive program content 610 that may be associated with keywords, or may identify captioning for linear and/or interactive program content 610 that may be scanned for keywords. In one implementation, using information from current events feeds 620, multimedia client/content analyzer 510 may prioritize multiple identified keywords.

Keywords identified by multimedia client/content analyzer 510 may be forwarded to decision manager 122, as indicated by reference number 630. Identified keywords 630 may also include information identifying, for example, the linear and/or interactive program content 610 from which the keywords were obtained and a unique identifier of the multimedia client/content analyzer 510 that received linear and/or interactive program content 610. Identified keywords 630 may also include, for example, priority information and/or additional criteria supplied by current events feeds 620.

Decision manager 122 may receive identified keywords 630 and may send a profile request 640 to user database 114 to retrieve a user profile 650 associated with multimedia client/content analyzer 510. Decision manager 122 may identify advertisements consistent with identified keywords 630 and/or user profile 650. For example, decision manager 122 may use identified keywords 630 to define a subset of candidate advertisements by cross-referencing the identified keywords against a list of available advertisements. Decision manager 122 may then select a particular advertisement from the subset based on user profile information. In other implementations, other decision criteria may be used to select the particular advertisement. Decision manager 122 may send pull instructions 660 to multimedia client/content analyzer 510 to instruct multimedia client/content analyzer 510 to send a pull request to content delivery system 110 for the selected advertising media. Pull instructions 660 may include, for example, a unique advertising identifier for the selected advertisements and timeslot assignments. As indicated by reference number 660, decision manager 122 may also send advertisement selection data to another location, such as data logger 124, for storage and later analysis.

Based on pull instructions 670, multimedia client/content analyzer 510 may provide pull request 680 to content delivery system 110. Content delivery system 110 may forward pull request 680 to content server(s) 105 to retrieve the selected advertisements. In response to pull request 680, content server(s) 105 may provide the particular linear and/or interactive advertising content 690 (e.g., from linear advertising content database 135 and/or non-linear advertising content database 140) to multimedia client/content analyzer 510 via content delivery system 110. In one implementation, content delivery system may supply the selected linear and/or interactive advertising content 690 to multimedia client/content analyzer 510 to store the advertising content 690 locally (e.g., within memory 220) for insertion during a subsequent break in program content.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
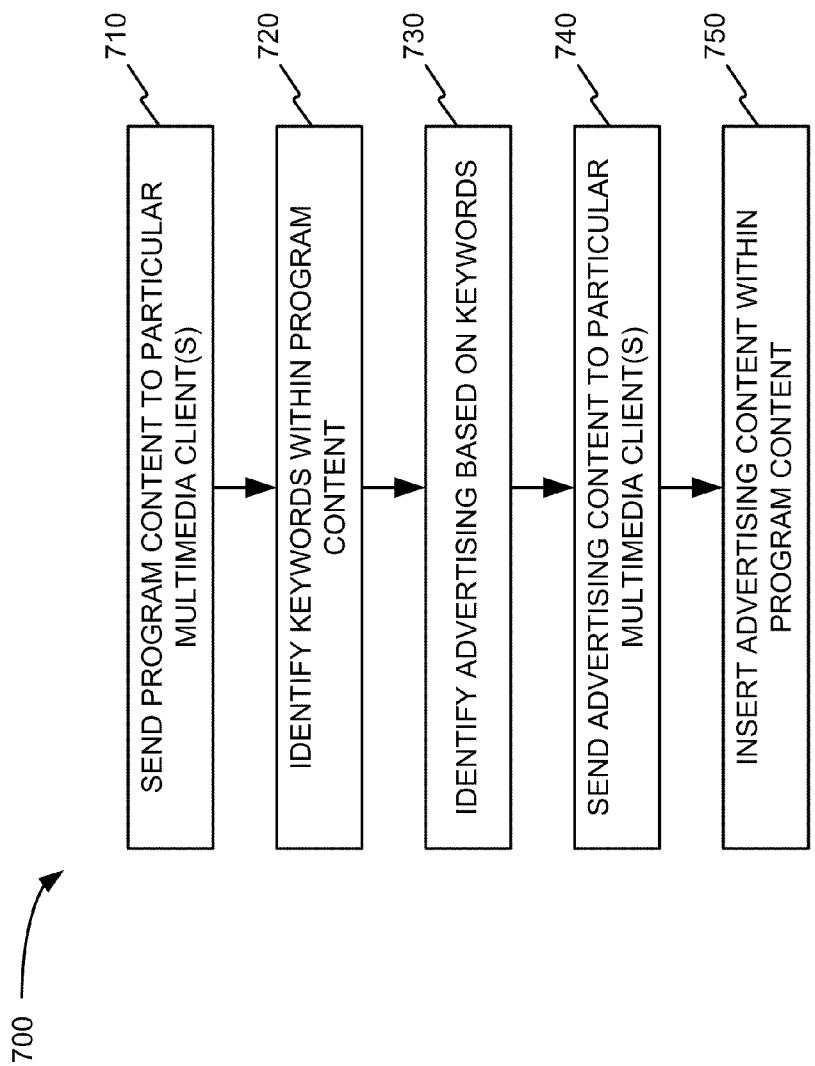
FIGS. 7-9 are flow charts illustrating an exemplary process for providing real time television advertisement shaping.
Figure 8:
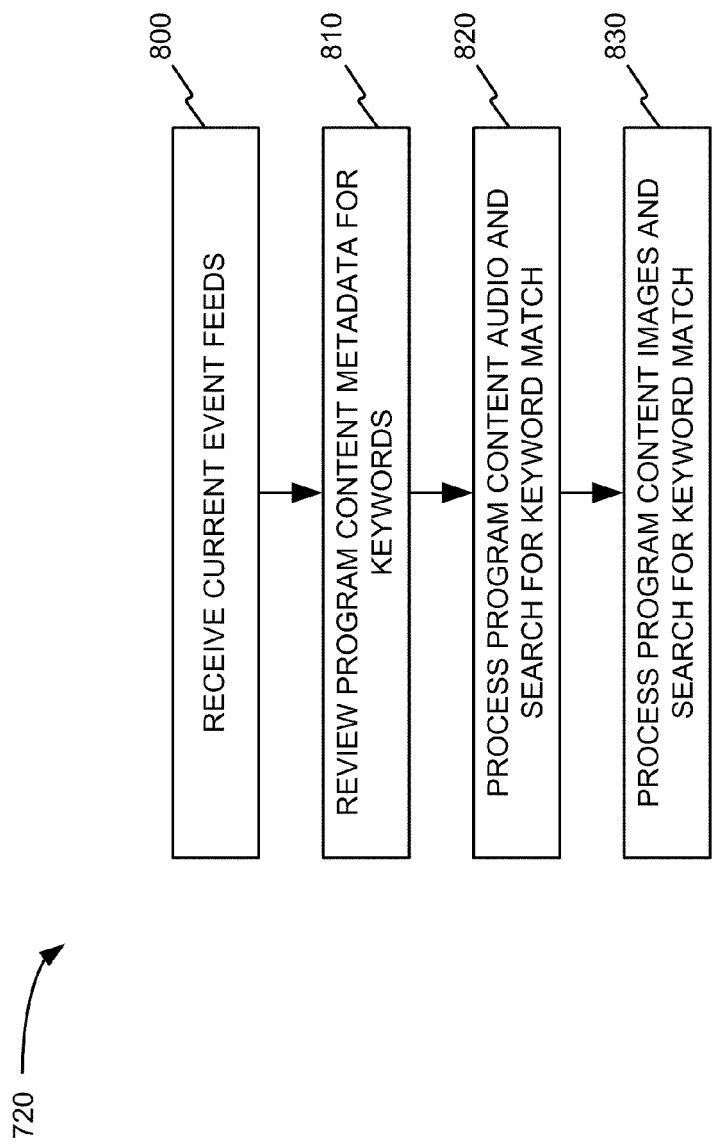
Figure 9:
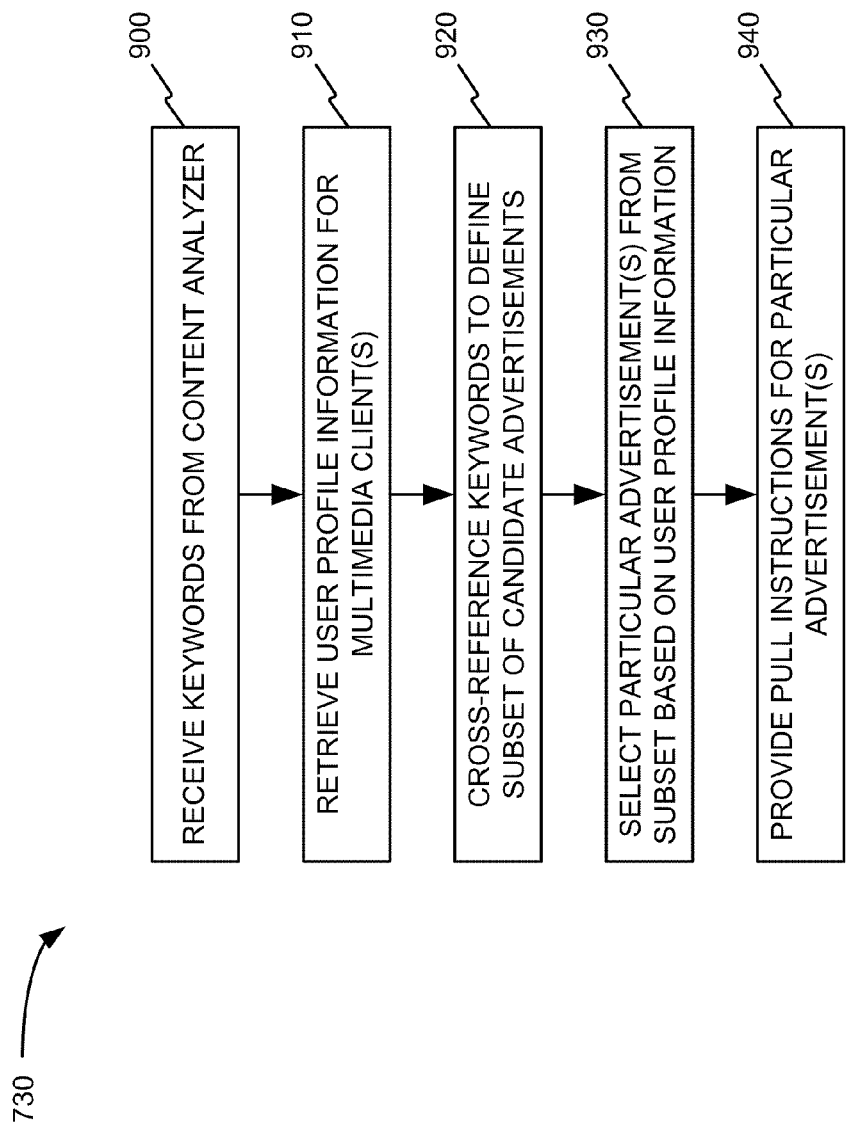

FIGS. 7-9 depict flow charts of an exemplary process 700 for providing real time television advertisement shaping. Some or all of process 700 may be performed by a multimedia client and/or content analyzer associated with a subscription multimedia service, such as multimedia client 170 or multimedia client/content analyzer 510. In some implementations, some or all of process 700 may be performed by multimedia client 170 or multimedia client/content analyzer 510 in conjunction with one or more other network components, such as content server 105, content delivery system 110, and/or data center 120.

Process 700 may include sending program content to one or more particular multimedia clients (block 710). For example, as described above in connection with FIG. 4, content delivery system 110 may provide linear and/or interactive program content 410 to multimedia client 170. Linear and/or interactive program content 410 may include, for example, content retrieved from content server 105 and/or broadcast content retrieved by content delivery system 110. Linear and/or interactive program content 410 may also include dedicated space/time for advertising. In one implementation, linear and/or interactive program content 410 may include metadata embedded within the program feed. In another implementation, linear and/or interactive program content 410 may include an audio component or captioning that may be scanned for keywords. Multimedia client 170 may receive linear and/or interactive program content 410 and present linear and/or interactive program content 410 to a viewer (e.g., via display 175).

Returning to FIG. 7, keywords within the program content may be identified (block 720). For example, content analyzer 112 may identify keywords within linear and/or interactive program content 410. In another implementation, multimedia client/content analyzer 510 may identify keywords within linear and/or interactive program content. Process block 720 is described further below in connection with FIG. 8.

Still referring to FIG. 7, advertising based on the keywords may be identified (block 730). For example, as described above in connection with FIG. 4, decision manager 122 may receive identified keywords 430 and identify advertisements consistent with identified keywords 430 and any addition data supplied by content analyzer 112. Process block 730 is described further below in connection with FIG. 9.

Again returning to FIG. 7, the advertising content may be sent to the particular multimedia client(s) (block 740), and the advertising content may be inserted within the program content (block 750). For example, as described above in connection with FIG. 4, content delivery system 110 may forward pull instructions 440 to content server(s) 105 to retrieve selected advertisements. In response to pull instructions 440, content server(s) 105 may provide the particular linear and/or interactive advertising content 460 (e.g., from linear advertising content database 135 and/or non-linear advertising content database 140) to multimedia client 170 via content delivery system 110. In one implementation, content delivery system 110 may insert the selected linear and/or interactive advertising content 460 into appropriate breaks in the linear and/or interactive program content 410. In another implementation, content delivery system 110 may supply the selected linear and/or interactive advertising content 460 to multimedia client 170 to store advertising content 460 locally (e.g., within memory 220) for insertion (e.g., using ad insertion technology for video) when a subsequent break in program content is encountered.

Process block 720 may include the process blocks illustrated in FIG. 8. As shown in FIG. 8, process block 720 may include receiving current events feeds, reviewing program content metadata for keywords (block 810), processing program content audio and searching for a keyword match (block 820), and/or processing program content images and searching for a keyword match (block 830). For example, as described above in connection with FIG. 6, multimedia client/content analyzer 510 may parse one or more keywords from metadata embedded within linear and/or interactive program content 610. In other examples, multimedia client/content analyzer 510 may identify keywords from speech recognition of an audio component of linear and/or interactive program content 610, may identify images from a video component of linear and/or interactive program content 610 that may be associated with keywords, or may identify captioning for linear and/or interactive program content 610 that may be scanned for keywords. In one implementation, using information from current events feeds 620, multimedia client/content analyzer 510 may prioritize multiple identified keywords.

Process block 730 may include the process blocks illustrated in FIG. 9. As shown in FIG. 9, process block 730 may include receiving keywords from content analyzer (block 900) and retrieving user profile information for the particular multimedia clients(s) (block 910). For example, as described above in connection with FIG. 6, decision manager 122 may receive identified keywords 630 and may send a profile request 640 to user database 114 to retrieve a user profile 650 associated with multimedia client/content analyzer 510.

Returning to FIG. 9, process block 730 may further include cross-referencing the keywords to define a subset of candidate advertisements (block 920), selecting particular one or more particular advertisements from the subset based on the user profile information (block 930), and providing pull instructions for the one or more particular advertisements (block 940). For example, as described above in connection with FIG. 6, decision manager 122 may identify advertisements consistent with identified keywords 630 and/or user profile 650. Decision manager 122 may use identified keywords 630 to define a subset of candidate advertisements by cross-referencing the identified keywords against a list of available advertisements. Decision manager 122 may then select a particular advertisement from the subset based on user profile information. In other implementations, other decision criteria may be used to select the particular advertisement. Decision manager 122 may send pull instructions 660 to multimedia client/content analyzer 510 to instruct multimedia client/content analyzer 510 to send a pull request to content delivery system 110 for the selected advertising media. Pull instructions 660 may include, for example, a unique advertising identifier for the selected advertisements and/or timeslot assignments.

Figure 10:
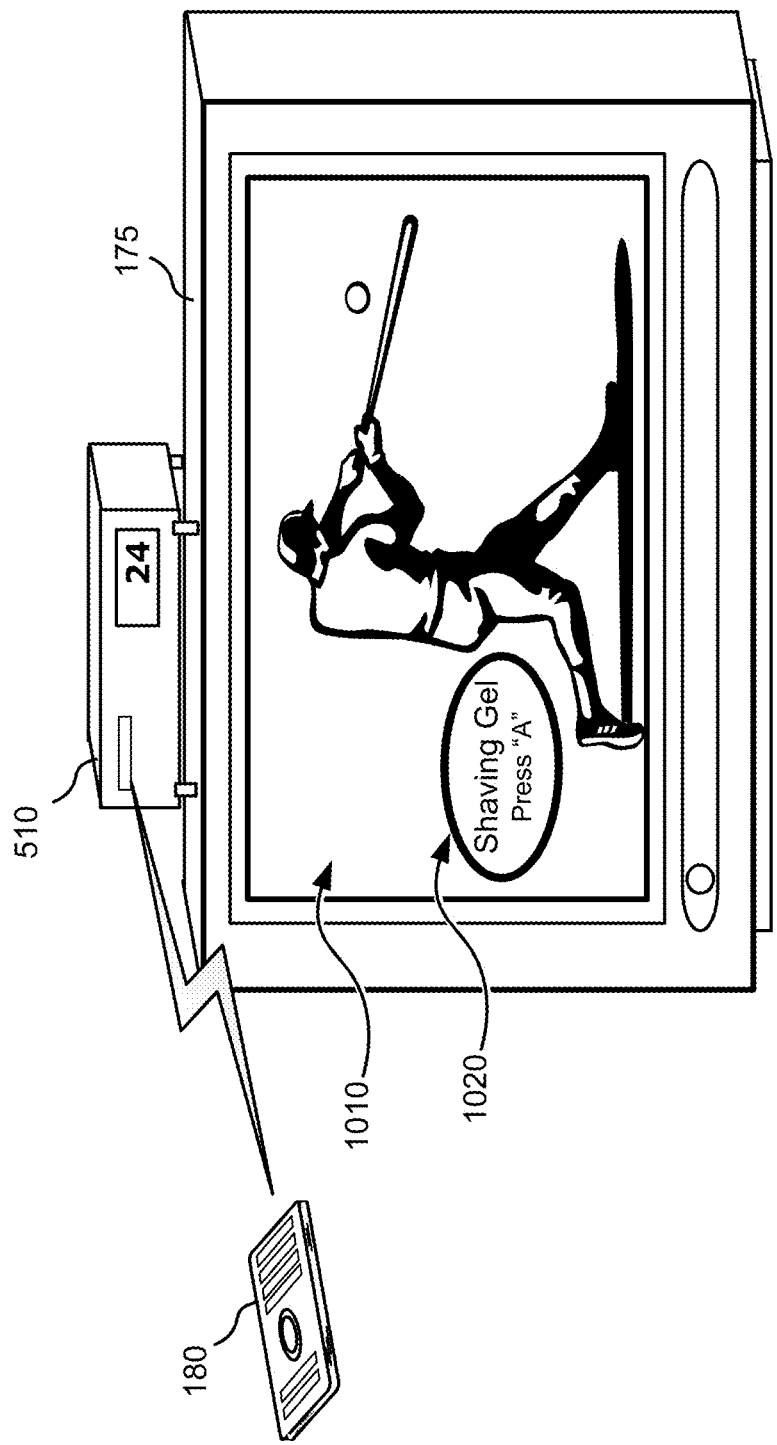
FIG. 10 provides an exemplary diagram of a user interface for real time television advertisement shaping according to an implementation described herein.

FIG. 10 provides an exemplary diagram of a user interface for real time television advertisement shaping according to an implementation described herein. More specifically, FIG. 10 provides an exemplary diagram of an on-screen display that includes a real time advertisement overlay. As shown in FIG. 10, a viewer may view program content via multimedia client on multimedia display device 175. While the viewer is watching a particular channel (e.g., channel "24"), program content 1010 is presented that may be parsed by multimedia client/content analyzer 510.

As shown in FIG. 10, program content 1010 may relate to a particular event (e.g., a baseball game with play-by-play commentary). Also assume for FIG. 10 that a particular baseball player (e.g., "John Dough") hits a home run during the displayed baseball game and that the play-by-play commentary includes the statement "Another home run for John Dough!" Also assume that multimedia client/content analyzer 510 includes instructions to identify the keyword term "John Dough" within six words of the term "home run."

Multimedia client/content analyzer 510 may identify a keyword combination of "home run" within six word of "John Dough" and provide the keyword combination to a data center (e.g., decision manager 122) to select an advertisement associated with the keyword combination. The data center may apply the keyword combination, along with user profile data and/or current events information, to identify a particular advertisement with a product (e.g., "Shaving Gel") that is endorsed by "John Dough." The data center may send pull instructions to multimedia client/content analyzer 510 to retrieve the particular advertisement and display the advertisement. In the example of FIG. 10, the particular advertisement may be displayed as an interactive overlay 1020 on program content 1010. Thus, interactive overlay 1020 may be shown to the viewer during, for example, the time that program content 1010 is displaying replays of the home run by John Dough. The viewer may select the interactive overlay 1020 (e.g., by pressing "A" on remote control 180). In another implementation, the particular advertisement may be a liner advertisement inserted during the next available break in program content 1010.

The illustration of FIG. 10 provides an exemplary format for presenting real time television advertisement shaping. Other formats and variations may be used.

Implementations described herein may provide systems and/or methods that receive, over a subscription multimedia network, television program content for presentation to a viewer, where the television program content includes an advertising break and identify a keyword associated with the television program content. The systems and/or methods may send, over the subscription multimedia network, the keyword to an advertisement server and receive from the advertisement server, an advertisement corresponding to the keyword. The systems and/or methods may provide, for display to the viewer, the advertisement within the advertising break.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowcharts of FIG. 7-9, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
  receiving, by a multimedia client, program content for presentation to a viewer;
  identifying, by the multimedia client, a keyword combination based on proximity of words of play-by-play commentary of the program content,
    the keyword combination describing an action that occurred during an event displayed during the program content;
  sending, by the multimedia client, the keyword combination to a server;
    receiving, by the multimedia client and based on sending the keyword combination to the server, an advertisement that is associated with a person who performed the action during the event; and
  presenting, for display to the viewer and during replays of the action, the advertisement in an interactive overlay displayed over the program content.

2. The method of claim 1, further comprising:
  storing a list of keywords,
    each keyword in the list of keywords being cross-referenced to at least one advertisement, and
    the list of keywords including one or more of the words.

3. The method of claim 2, further comprising:
  receiving, by the multimedia client, a current events feed that includes changes to the list of keywords, and
  updating the list of keywords based on the current events feed.

4. The method of claim 1, where receiving the advertisement that is associated with the person includes:
receiving, by the multimedia client and from the server, a pull instruction for the advertisement based on sending the keyword combination to the server;
sending, by the multimedia client and based on the pull instruction, a pull request to retrieve the advertisement from a different server, and
receiving, by the multimedia client and after sending the pull request, the advertisement.

5. The method of claim 1, where the advertisement is a linear advertisement.

6. The method of claim 1, where presenting the advertisement includes:
presenting, for display, the advertisement simultaneously with the program content.

7. A system comprising:
one or more processors to:
receive television content for presentation to a viewer;
identify a keyword combination based on words identified by way of analysis of the television content,
the keyword combination describing an action that occurred during an event displayed during the television content;
send the keyword combination to a server;
receive, based on sending the keyword combination to the server, an advertisement that is associated with a person who performed the action during the event; and
provide, for display to the viewer and during a replay of the action, the advertisement as an interactive overlay displayed over the television content.

8. The system of claim 7, where the keyword combination includes at least one of an alpha-numeric sequence or a combination of two or more words.

9. The system of claim 7, where the one or more processors are further to store:
a list of keywords that are cross-referenced to at least one advertisement,
the list of keywords including one or more of the words.

10. The system of claim 7, where the television content is linear television content that includes a plurality of scheduled advertising breaks.

11. The system of claim 7, where the television content includes at least one of:
a dedicated presentation space into which the advertisement is inserted, or
a trigger for advertising.

12. The system of claim 7, where the one or more processors are further to:
receive, from a remote control, information identifying a selection of the interactive overlay.

13. A method comprising:
sending, by one or more devices and to a multimedia client, program content requested by the multimedia client;
receiving, by the one or more devices, a keyword combination associated with the program content,
the keyword combination being determined by the multimedia client based on words identified by way of analysis of the program content, and
the keyword combination describing an action that occurred during an event displayed during the program content;
determining, by the one or more devices and based on the keyword combination, an advertisement that is associated with a person who performed the action during the event; and
sending, by the one or more devices, the advertisement to the multimedia client for the multimedia client to provide, for display, the advertisement in an interactive overlay on the program content during a replay of the action.

14. The method of claim 13, further comprising:
storing, by the one or more devices and in a memory, a selection history regarding a selection of the advertisement for the multimedia client, and
providing data associated with the advertisement based on the selection history.

15. The method of claim 13, where sending the advertisement includes:
sending, by the one or more devices, instructions to the multimedia client to retrieve the advertisement,
receiving, from the multimedia client, a pull request for the advertisement, and
sending the advertisement to the multimedia client based on the pull request.

16. The method of claim 13, where determining the advertisement to be provided to the multimedia client includes:
receiving user profile information associated with the multimedia client;
cross-referencing the keyword combination against a list of available advertisements to identify a subset of candidate advertisements; and
selecting, from the subset of candidate advertisements, the advertisement to be provided to the multimedia client based on the user profile information.

17. A system comprising:
one or more processors to:
receive a keyword combination identified based on words identified by way of analysis of television content being provided to a multimedia client,
the keyword combination identifying an action that occurred during an event displayed during the television content and a person who performed the action during the event;
select, based on the keyword combination that identifies the action and the person, an advertisement; and
send, to the multimedia client, pull instructions for the multimedia client to retrieve the advertisement based on the pull instructions and to display the advertisement as an interactive overlay on the television content during a replay of the action.

18. The system of claim 17, where, when selecting the advertisement, the one or more processors are to:
retrieve user profile information associated with the multimedia client, and
select the advertisement based on the keyword combination and the user profile information.

19. A non-transitory computer-readable medium comprising:
one or more instructions that, when executed by at least one processor, cause the at least one processor to:
send, to a multimedia client, television program content requested by a viewer;
identify a keyword combination based on proximity of terms of play-by-play commentary of the television program content,
the keyword combination describing an action that occurred during an event displayed during the television program content;
select, from a list of advertisements and based on the keyword combination, a particular advertisement that is associated with a person who performed the action during the event; and send, to the multimedia client, instructions for the multimedia client to retrieve the particular advertisement and to provide the particular advertisement as an interactive overlay on the television program content during a replay of the action.

20. The non-transitory computer-readable medium of claim 19, further comprising:
one or more instructions that, when executed by the at least one processor, cause the at least one processor to:
retrieve user profile information associated with the multimedia client; and
modify the list of advertisements based on the user profile information.

21. The method of claim 1, where the program content includes a video component, an audio component, and one or more of metadata or captioning.

22. The system of claim 17, where, when selecting the advertisement, the one or more processors are to:
identify the person who performed the action during the event based on the keyword combination, and
select the advertisement that is for a product endorsed by the person.

23. The non-transitory computer-readable medium of claim 19, where the one or more instructions to identify the keyword combination include:
one or more instructions that, when executed by the at least one processor, cause the at least one processor to:
identify a first term, of the terms, by way of analysis of the play-by-play commentary of the television program content,
identify a second term, of the terms, by way of analysis of the play-by-play commentary of the television program content,
determine that the first term occurs within a particular distance of the second term during the television program content, and
identify the keyword combination based on determining that the first term is within the particular distance of the second term.

* * * * *